J. SANGSTER.
Churn.

No. 27,570.

Patented March 20, 1860.

WITNESSES
Nathan Thayer
Amos W Sangster

INVENTOR
James Sangster

UNITED STATES PATENT OFFICE.

JAMES SANGSTER, OF BUFFALO, NEW YORK.

CHURN.

Specification of Letters Patent No. 27,570, dated March 20, 1860.

*To all whom it may concern:*

Be it known that I, JAMES SANGSTER, of the city of Buffalo, county of Erie, and State of New York, have invented certain new and useful Improvements in Churns for the Manufacture of Butter; and I do hereby declare that the following is a full and exact description thereof reference being had to the accompanying drawings and to the letters of reference marked thereon.

Figure 1:
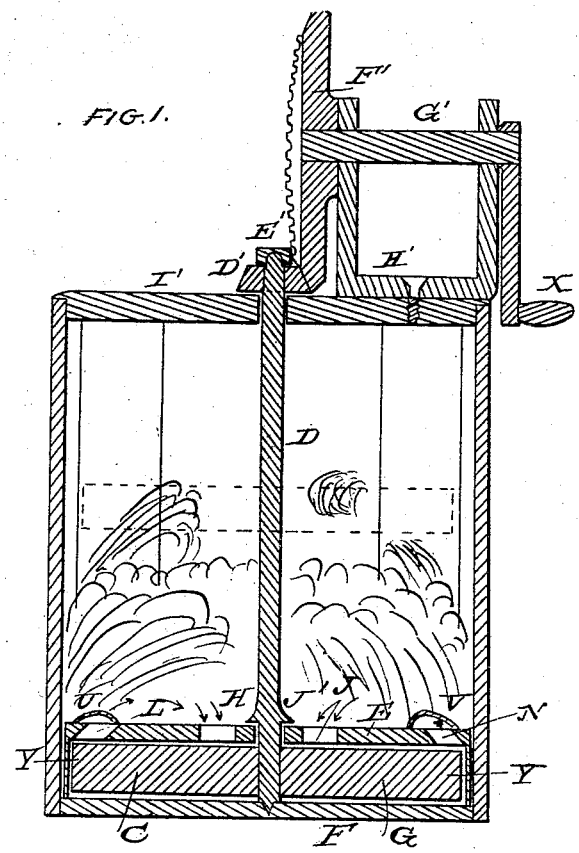
Figure 2:
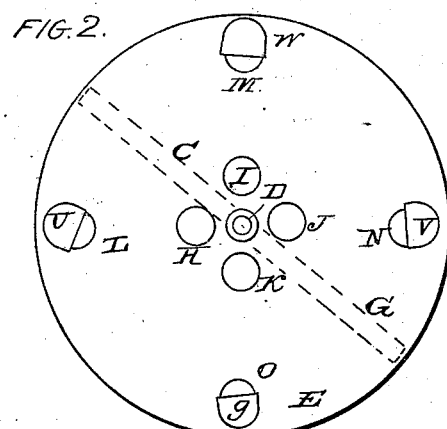
Figure 3:
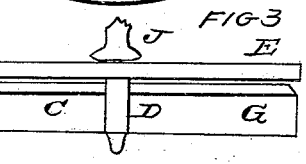

The same letters in Figures 1, 2 and 3 represent similar parts in each.

Fig. 1 represents a section view of said churn; D represents a spindle or rod to which is attached the dashers or paddles C, and G and Z; E represents a partition (or false bottom) which forms an apartment in which the paddles C, and G revolve. The partition E is kept up in its place by the rim Y (or its equivalent). H and J represent apertures in partition E through which the cream or milk is drawn downward when the churn is being operated; L and N are apertures through which the cream or milk is forced upward by centrifugal force when the paddles C and G are made to revolve; J′ represents a shoulder which prevents partition E from being forced upward while operating the churn; U and V represent caps which partially cover the apertures L and N. They are placed in such a position as to cause the fluid to flow in streams against each other, by boring the holes L and N at the same angles at which the caps U and V are set. The caps may be dispensed with and the same result obtained. D′, F′, G′, H′ and X represent the machinery and gearing by which motion is given to the dashers or paddles C and G, and Z; I′ is the top or cap of the churn.

Fig. 2 represents a plan view of the partition E in which is represented four apertures near the center of said partition down which, the cream or milk is drawn, while the churn is being operated. They are represented by letters H, I, J and K. The apertures through which the cream or milk is forced upward by the operation of the churn are also represented and are marked by letters L, M, N and O. The letters Q, U, W and V represent the caps over said apertures L, M, N and O.

In Fig. 3 a side elevation of the partition E is shown also a perspective view of the dashers or paddles C and G are seen with part of the spindle D. One or more dashers or paddles may be fastened or attached to the shaft D, above the partition E, as shown by the dotted lines in Fig. 1, and designated by letter Z. The upper dasher, or paddle, or dashers, or paddles, are made to revolve in a direction opposite, or contrary to the action or movement of the cream, or milk.

The churn is operated as follows: Motion is given to the spindle D, and dashers or paddles C, and G, and Z, by turning the crank X, and by that motion the cream or milk and air is drawn down through the apertures H and J as shown in Fig. 1 (or H, I, J and K as shown in Fig. 2) by centrifugal force, and by the same force it is thrown upward through the apertures designated by letters L and N in Fig. 1, and by letters L, M, N and O in Fig. 2. The direction in which the fluid flows is shown by the arrows in Figs. 1 and 2.

The churn may be made of wood, tin or any other suitable material.

What I claim as my invention and desire to secure by Letters Patent is—

The combination of the paddles Z, and C, and G, with the partition E, when said partition is provided with openings H, J, I, K near its center and with openings L, M, N, O, near its periphery which are partially covered by caps, as seen; for the purpose of passing the cream around and around through the openings from circumference to center and vice versa substantially as herein specified.

JAMES SANGSTER. [L. S.]

Witnesses:
 AMOS W. SANGSTER,
 NATHAN THAYER.